(12) United States Patent
Adel et al.

(10) Patent No.: US 11,087,202 B2
(45) Date of Patent: *Aug. 10, 2021

(54) SYSTEM AND METHOD FOR USING DEEP LEARNING TO IDENTIFY PURCHASE STAGES FROM A MICROBLOG POST

(71) Applicant: FUJIFILM Business Innovation Corp., Tokyo (JP)

(72) Inventors: Heike Adel, Munich (DE); Francine Chen, Menlo Park, CA (US); Yin-Ying Chen, Sunnyvale, CA (US)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 1155 days.

This patent is subject to a terminal disclaimer.

(21) Appl. No.: 15/445,788

(22) Filed: Feb. 28, 2017

(65) Prior Publication Data
US 2018/0247189 A1    Aug. 30, 2018

(51) Int. Cl.
*G06N 3/04* (2006.01)
*G06Q 30/02* (2012.01)
(Continued)

(52) U.S. Cl.
CPC ............. *G06N 3/0445* (2013.01); *G06N 3/02* (2013.01); *G06N 3/0454* (2013.01); *G06N 20/20* (2019.01);
(Continued)

(58) Field of Classification Search
CPC ...... G06N 3/02; G06N 3/0445; G06N 3/0454; G06N 3/0472; G06N 5/02; G06N 5/022; G06N 5/025; G06N 5/046; G06N 5/047; G06N 20/00; G06N 20/10; G06N 20/20; G06Q 30/0251; G06Q 30/0253;
(Continued)

(56) References Cited

U.S. PATENT DOCUMENTS

2011/0246920 A1   10/2011   Lebrun
2015/0220983 A1*  8/2015   Chauhan ............ G06Q 30/0255
                                                              705/14.53

(Continued)

FOREIGN PATENT DOCUMENTS

JP          2009199341 A          9/2009

OTHER PUBLICATIONS

Korpusik, Mandy, et al., "Recurrent Neural Networks for Customer Purchase Prediction on Twitter", 4 pages, Copyright 2016, CBRecSys 2016, Sep. 16, 2016, Boston, MA US.

(Continued)

*Primary Examiner* — Shane D Woolwine
(74) *Attorney, Agent, or Firm* — Procopio, Cory, Hargreaves & Savitch LLP

(57) ABSTRACT

A method and system of targeting information for a user is provided. The method includes collecting one or more digital posts that identify a product and are associated with a digital account, identifying, by a neural network, a stage of a decision model associated with each of the one or more digital posts based on a feature representation generated for each digital post, and transmitting product-related information to the digital account, wherein the transmitting is based on the stage of the decision model identified for each of the one or more digital posts.

20 Claims, 9 Drawing Sheets

(51) Int. Cl.
| | |
|---|---|
| *G06Q 50/00* | (2012.01) |
| *G06N 3/02* | (2006.01) |
| *G06N 20/20* | (2019.01) |
| *G06N 20/10* | (2019.01) |
| *G06N 5/02* | (2006.01) |
| *G06N 5/04* | (2006.01) |
| *G06N 20/00* | (2019.01) |

(52) U.S. Cl.
CPC ......... *G06Q 30/0269* (2013.01); *G06Q 50/01* (2013.01); *G06N 3/0472* (2013.01); *G06N 5/02* (2013.01); *G06N 5/022* (2013.01); *G06N 5/025* (2013.01); *G06N 5/046* (2013.01); *G06N 5/047* (2013.01); *G06N 20/00* (2019.01); *G06N 20/10* (2019.01)

(58) Field of Classification Search
CPC ........... G06Q 30/0255; G06Q 30/0269; G06Q 30/0271; G06Q 30/0277; G06Q 50/01
See application file for complete search history.

(56) References Cited

U.S. PATENT DOCUMENTS

| | | | | |
|---|---|---|---|---|
| 2016/0300135 | A1* | 10/2016 | Moudy | .................... G06F 40/40 |
| 2017/0026331 | A1* | 1/2017 | Vijay | ...................... H04L 51/32 |
| 2017/0249389 | A1* | 8/2017 | Brovinsky | .......... G06F 16/9535 |

OTHER PUBLICATIONS

Norgueira Dos Santos, Cicero, et al., "Classifying Relations by Ranking with Convolutional Neural Networks", 10 pages, arXiv:1504.06580v2 [cs.CL] May 24, 2015.

Ding, Xiao, et al., "Mining User Consumption Intention from Social Media Using Domain Adaptive Convolutional Neural Network", 7 pages, Copyright 2015, Association for the Advancement of Artificial Intelligence.

Lassen, Niels Buus, et al., "Predicting iPhone Sales from iPhone Tweets", 10 pages, 2014 Copenhagen Business School, Computational Social Science Laboratory, Department of ITM, Frederiksberg, Denmark.

Morris, Meredith Ringel, et al., "What Do People Ask Their Social Networks, and Why? A Survey Study of Status Message Q&A Behavior", 10 pages, Copyright 2010 ACM 978-1-60558-929-9-9/10/04 CHI 2010, Apr. 10-15, 2010, Atlanta GA US.

Mahmud, Jalal, et al., "Predicting Attitute and Actions of Twitter Users", 5 pages, IUI 2016—Social Media, Mar. 7-10, 2016, Sonoma, CA US Copyright 2016 ACM 978-1-4503-4137-0/16/03.

Tang, Duyu, et al., "Document Modeling with Gated Recurrent Neural Network for Sentiment Classification", 11 pages, Proceedings of the 2015 Conference on Empirical Methods in Natural Language Processing, pp. 1422-1432, Lisbon, Portugal, Sep. 17-21, 2015. Copyright 2015 Association for Computational Linguistics.

Godin, Frederic, et al., "Multimedia Lab @ ACL W-NUT NER Shared Task: Named Entity Recognition for Twitter Microposts using Distributed Word Representations", 8 pages, Ghent University—iMinds, Multimedia Lab, Ghent, Belgium 2015.

Chung, Junyoung, et al., "Empirical Evaluation of Gated Recurrent Neural Networks on Sequence Modeling", 9 pages, arXiv:1412.3555v1 [cs.NE] Dec. 11, 2014.

Sakaki, Shigeyuki, et al., "Corpus for Customer Purchase Behavior Prediction in Social Media", 5 pages, FX Palo Alto Laboratory, Inc., Palo Alto, California, US 2016.

Mikolov, Tomas, et al., "Efficient Estimation of Word Representations in Vector Space", 12 pages, arXiv: 1301.3781v3 [cs.CL] Sep. 7, 2013.

Kalchbrenner, Nal, et al., "A Convolutional Neural Network for Modelling Sentences", 11 pages, arXiv:1402.2188v1 [cs.CL], Apr. 8, 2014.

Cho, Kyunghyun, et al., "Learning Phase Representations using RNN Encoder-Decoder for Statistical Machine Translation", 15 pages, arXiv:1406.1078v3 [cs.CL] Sep. 3, 2014.

Bahdanau, Dzmitry, et al., "Neural Machine Translation by Jointly Learning to Align and Translate", 15 pages, arXiv:1409.0473v7 [cs.CL] May 19, 2016.

Hermann, Karl Moritz, et al., "Teaching Machines to Read and Comprehend", 14 pages, arXiv:1506.03340v3 [cs.CL] Nov. 19, 2015.

Hochreiter, Sepp, et al., "Long Short-Term Memory", 46 pages, Copyright 2001, Neural Computation 9, 1735-1780 (1997), Copyright 1997 Massachusetts Institute of Technology.

Nakov, Preslav, et al., "SemEval-2016 Task 4: Sentiment Analysis in Twitter", 18 pages, Proceedings of SemEval-2016, pp. 1-18, San Diego, CA, Jun. 16-17, 2016. Copyright 2016 Association for Computational Linguistics.

Notice of Reasons for Refusal for related JP App No. 2017-178019 dated Jun. 1, 2021 5 pgs.

* cited by examiner

SYSTEM AND METHOD FOR USING DEEP LEARNING TO IDENTIFY PURCHASE STAGES FROM A MICROBLOG POST

BACKGROUND

Field

The present disclosure relates to social media networks, and more specifically, to systems and methods of using social media networks to identify purchase behavior.

Related Art

In related art social media systems, advertisers may be aware of the cost of sending ads, especially those with low follow-through, and want to accurately target their ads to users. Using these related art social media systems, some users may share their interest in a product or a category of products by posting on e-commerce websites, chat or posting boards dedicated to discussion of products or through microblog posts. Based on this shared interest, a related art system may attempt to identify users having an intention to purchase a product (e.g. "Purchase Intent").

However, some users may need to go through a multi-stage purchase decision making process (e.g., the AIDA (Awareness/Attention, Interest, Desire, Action) model purchase decision process). For example, a user may need to first be aware of a product, then become interested in the product, then desire the product, before being ready to purchase the product. Social media posts can cover a variety of genres, including informative, topical, emotional, or trivial. Thus, a user's posts mentioning a product may be indicative of awareness or interest, but not desire or action and thus targeted marketing may be premature or a different approach may be required based on the user's purchase stage. Related art social media may not determine where in the purchase decision making process a user may be.

SUMMARY OF THE DISCLOSURE

Aspects of the present disclosure may include a method of targeting information. The method includes collecting one or more digital posts that identify a product and are associated with a digital account, identifying, by a neural network, a stage of a decision model associated with each of the one or more digital posts based on a feature representation generated for each digital post, and transmitting product-related information to the digital account, wherein the transmitting is based on the stage of the decision model identified for each of the one or more digital posts.

Additional aspects of the present disclosure may include a non-transitory computer readable medium having stored therein a program for making a computer execute a method of targeting information. The method includes collecting one or more digital posts that identify a product and are associated with a digital account, identifying, by a neural network, a stage of a decision model associated with each of the one or more digital posts based on a feature representation generated for each digital post, and transmitting product-related information to the digital account, wherein the transmitting is based on the stage of the decision model identified for each of the one or more digital posts.

Additional aspects of the present disclosure may also include an apparatus configured to target information. The apparatus including a memory storing one or more digital posts that identify a product and are associated with a digital account, and a processor. The processor executing a process including identifying, by a neural network, a stage of a decision model associated with each of the one or more digital posts based on a feature representation generated for each digital post, and transmitting product-related information to the digital account, wherein the transmitting is based on the stage of the decision model identified for each of the one or more digital posts.

Additional aspects of the present disclosure may also include another apparatus configured to target information. The apparatus including a memory storing one or more digital posts that identify a product and are associated with a digital account, means for identifying a stage of a decision model associated with each of the one or more digital posts based on a feature representation generated for each digital post, and means for transmitting product-related information to the digital account, wherein the transmitting is based on the stage of the decision model identified for each of the one or more digital posts.

DETAILED DESCRIPTION

Figure 1:
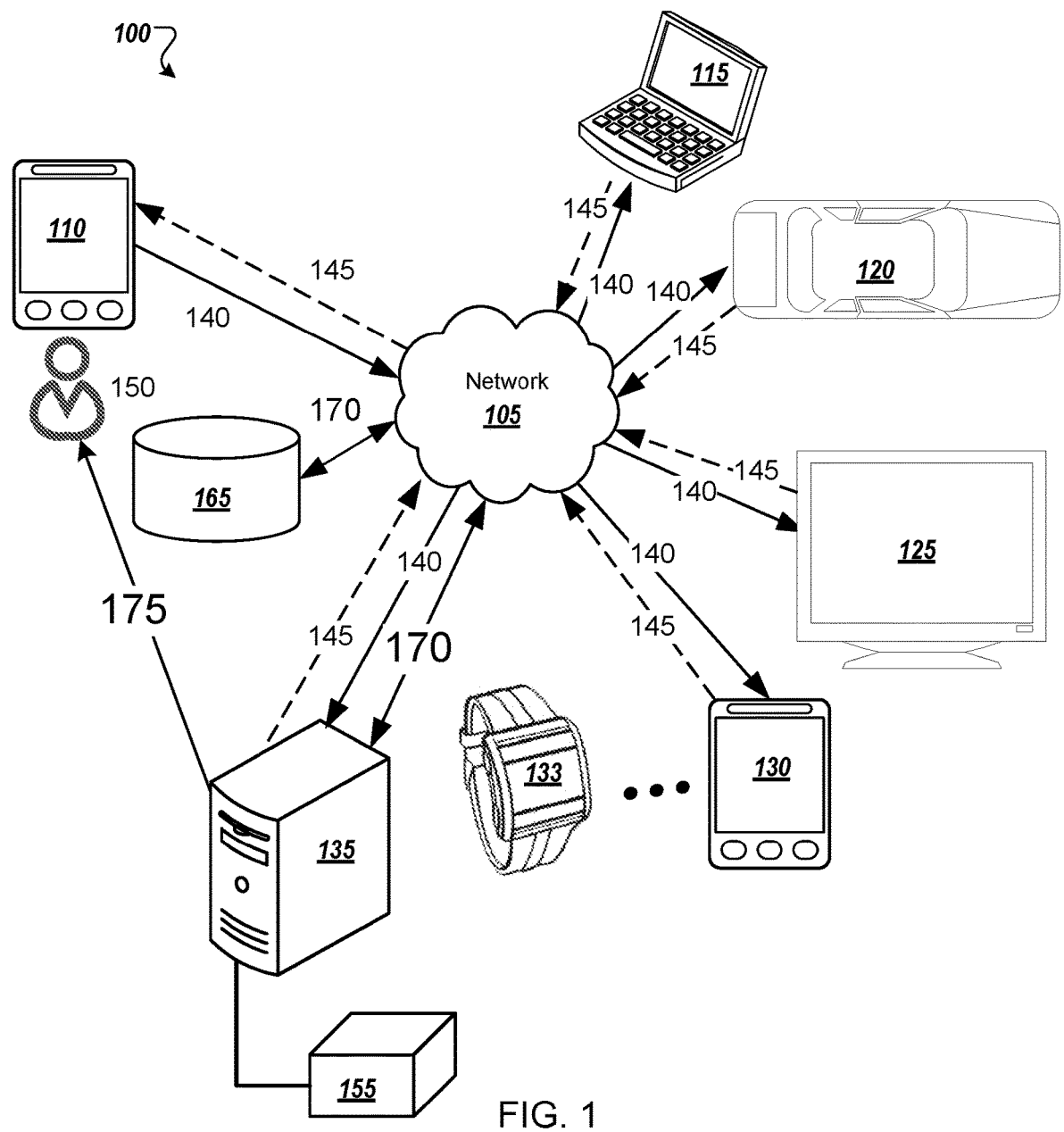
FIG. 1 illustrates a social media environment usable with example implementations of the present application.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

Additionally, though example implementations of the present application are discussed in the context of a social media environment, example implementations are not limited to this context and may be used in any digital or web enabled posting board environment shared by one or more users that might be apparent to a person of ordinary skill in the art. For example, some example implementations may include a secured digital posting board accessible within a company by employees or contractors and also accessible by customers, but private from other outside users. Other example implementations may include an online customer service center that allows users to post regarding issues with products and receive real-time or time-shifted (e.g., delayed) customer support.

In addition to determining purchase intent as discussed above, an AIDA (Awareness/Attention, Interest, Desire, Action) model may be used by advertisers to model the stages in a user's purchase decision making process. Example implementations of the present application may use neural networks and multitask learning to determine where a user is in the purchase decision making process and provide advertising or information targeted to a user that might be receptive based on his or her stage of the process. For example, for users with interest in a product, a manufacturer of the product, or of a competitor product, may wish to show an ad with features about their product. Further, for users with the desire to purchase a particular product, stores offering the product of interest may want to offer the user coupons or information about upcoming sales.

In example implementations, social media posts or microblog posts containing information useful for marketing and customer relationship management, including user behavior, opinions, and purchase interest, may be identified using deep learning methods. Further, the social media posts identified using deep learning methods may also be used to automatically identify the process stages associated with the AIDA model stages associated with the user authoring or posting the social media posts. In some example implementations, the "Action" (e.g., "A") stage may be identified as "Bought" or "Buying" (e.g., "B"). Additionally, in some example implementations, the modeled stages may also include "Unhappy" or "U" (e.g., social media post may be classified as indicative of negative sentiment, namely unhappiness of a user with a product). Further, in some example implementations, the purchase decision making process stage model may also include an open-class classification (e.g., an artificial class, "N" or "not a purchase decision stage") used to classify social media posts not related to purchase decision process stages. Thus, in some example implementations, the purchase decision making process stage model may be considered an AIDBUN (e.g., Aware, Interested, Desire, Bought, Unhappy, Not purchase decision stage) model.

FIG. 1 illustrates a social media environment 100 usable with example implementations of the present application. In some example implementations, the social media environment may be a microblog social media environment. For example, but not by way of limitation, the microblog may include TWITTER, TUMBLR, TOUT, TENCENT Weibo or any other microblogging platform that may be apparent to a person of ordinary skill in the art. However, example implementations of the social media environment 100 are not limited to microblogs, and could be any social media environment. The illustrated social media environment 100 includes a plurality of devices 110-135, communicatively connected to one another via, for example, a network 105 (e.g., by wireline and/or wireless connections).

Devices 110-135 may include, but are not limited to, a computer 115 (e.g., a laptop computing device), mobile devices 110, 130 (e.g., smartphone or tablet), a television 125, a device associated with a vehicle 120, a wearable device 133 (such as a smart watch), and a server computer 135. The devices 110-135 may have a computing environment as shown below in FIG. 9.

In some example implementations, one or more of the devices 110-135 may be associated with a user (e.g., the device 110 may be used by the user 150 to draft, edit, upload and transmit a social media post 140). For example, the device 110 associated with user 150 may transmit the social media post 140 to the social media environment 100 and be received to the other devices 115-135 associated with other respective users via the network 105. Further, each of the other devices 115-135 may optionally (indicated by broken line) be used to send a reply 145 to the social media post 140. In example implementations of the present application, at least one device 135 may also analyze the social media posts 140 by the user 150 to detect any references to products and, based on the detected reference, determine where the user may be in a purchase decision making process (e.g., an AIDA or AIDBUN modeled process) using processes discussed below in FIGS. 2-5 below. This analysis and determination may be performed by a processor 155 connected, associated, or integrated into the device 135.

Further, based on a determination of where the user 150 may be in the purchase decision making process, the processor 155 may cause the device 135 to send additional information 175 about the product, tailored to the user's stage of the decision making process, directly to the user 150. For example, the additional information 175 could include information about new features of the product or consumer reviews when the user is in the "Awareness" or "Interest" stages and information about upcoming sales, discounts, or rebates when the user is in the "Desire" or "Action" stages. Other information to be sent to the user based on the detected stage of the purchase decision making process may be apparent to a person of ordinary skill in the art.

Further, in some example implementations the processor 155 may cause the device 135 to first communicate with another social media network or database 165 to detect information 170 about the user 150. For example, based on the determination that the user 150 is likely to purchase the product, the device 135 may search other social media networks or databases (such as FACEBOOK, INSTAGRAM, etc.) for other social media accounts of the user 150. Further, using the other social media accounts, the device 135 may detect information 170, such as age, geographic location, interests, hobbies, etc. associated with the user 150. Based on the detected information 170, the processor 155 may control the device 135 to specifically tailor the additional information 175 sent to the user 150 about the product to the user 150. For example, the additional information 175 could include advertisements for the product tailored to the user's 150 age and other demographics. The additional information 175 could also include information about new features or consumer reviews that are tailored to the user's 150 hobbies. Similarly, the additional information 175 could include information about upcoming sales, discounts, or rebates in the user's 150 geographic area.

Additionally, though example implementations of the present application are discussed in the context of a social media environment, example implementations are not limited to this context and may be used in any digital or web enabled posting board environment shared by one or more users that might be apparent to a person of ordinary skill in the art. For example, some example implementations may include a secured digital posting board accessible within a company by employees or contractors and also accessible by customers, but private from other outside users. Other example implementations may include an online customer service center that allows users to post regarding issues with products and receive real-time or time-shifted (e.g., delayed) customer support.

Figure 2:
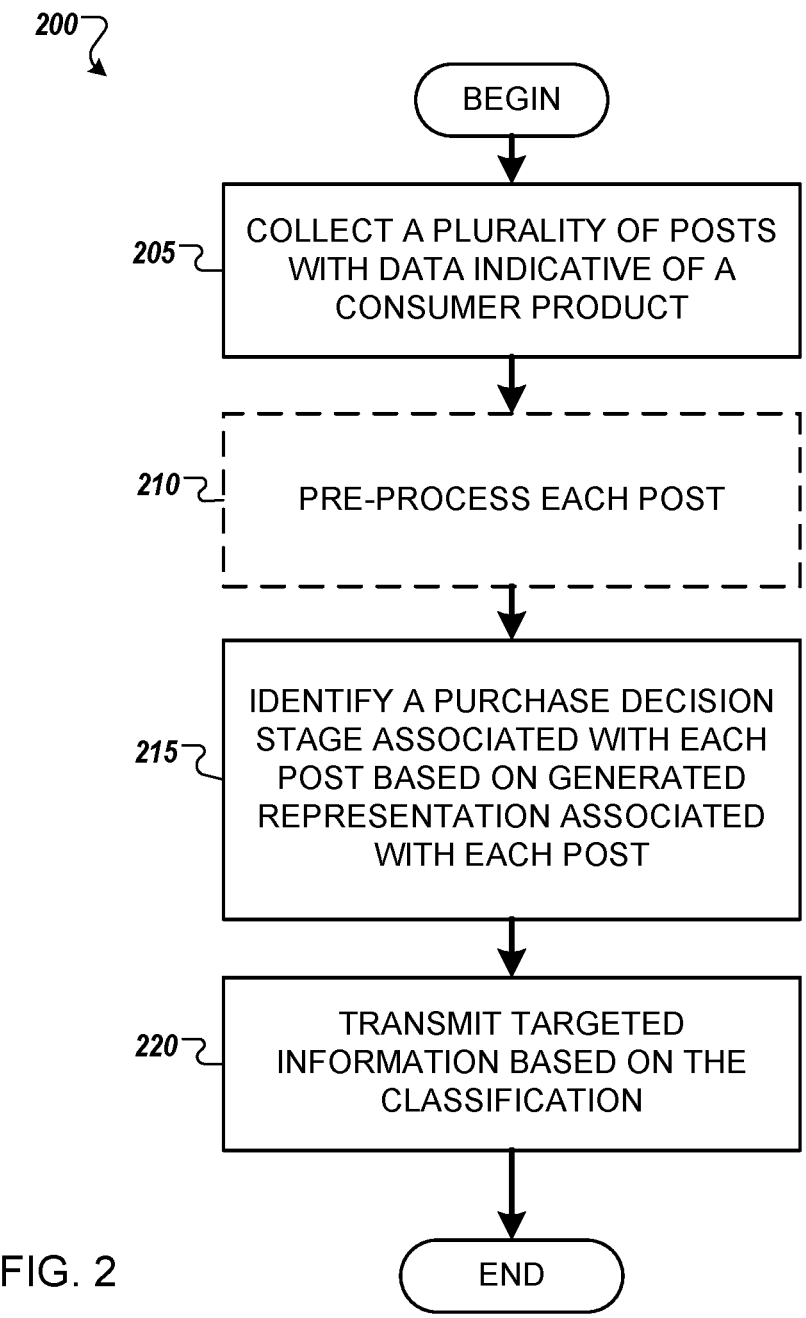
FIG. 2 illustrates a flow chart of a process of targeting to a user based on an identified decision purchase stage according to example implementations of the present application.

FIG. 2 illustrates a flow chart of a process 200 of targeting information to a user based on an identified decision purchase stage of a user according to example implementations of the present application. The illustrated process 200 may be performed by a processor (such as processor 155) of a device (such as device 135) to provide user focused product information. In process 200, a plurality of social media posts containing data indicative of a specific product is detected at 205. The data could be text or audio describing or referencing the product, such as the name or make or model of the product or a general reference to the product. The data could also be an image or video of a make or model of the product. The data could be detected at 205 by analyzing all social media posts to a specific social media source or network. The data could also be detected at 205 by focusing on groups or sub-groups in a social media source or network dedicated to products generally, particular types of products (such as camera, mobile phones, or cars), or to particular manufacturers. The grouping and subgrouping is not limited to the above and other example groupings may be employed.

After, the social media posts have been collected, the collected social media posts may optionally be pre-processed at 210 using a sub-process, such as sub-process 300 discussed in greater detail below.

Further, at 215, a purchase decision stage (e.g., a stage of the AIDBUN model, for example) associated with each social media post may be identified based on generated representations associated with each social media post. The representations may be generated based on content features extracted from each social media post. The extraction of content features, generation of representations, and identification of purchase decision process stages are discussed in greater detail below with respect to sub-processes 400 and 500 of FIGS. 4 and 5.

At 220, targeted information relating to the product may be transmitted to the user associated with the plurality of detected posts, such as the author or the owner of the social media account based on the purchase stage classification (e.g., AIDBUN model stage). For example, if the plurality of social media posts is identified as being associated with the "desire" stage, coupons or notifications of upcoming sales may be transmitted to the user to encourage purchase. Alternatively, if the plurality of social media posts is identified as being associated with the "aware" or "interested" stages, product reviews or product feature information may be transmitted to encourage "desire".

The additional information may be transmitted in a variety of ways including web browser pop-ups, emails, instant messages, social media messages, or any other mechanism for transmitting information to a social media account user that may be apparent to a person of ordinary skill in the art. After the targeted information is transmitted, the process 200 may end.

Figure 3:
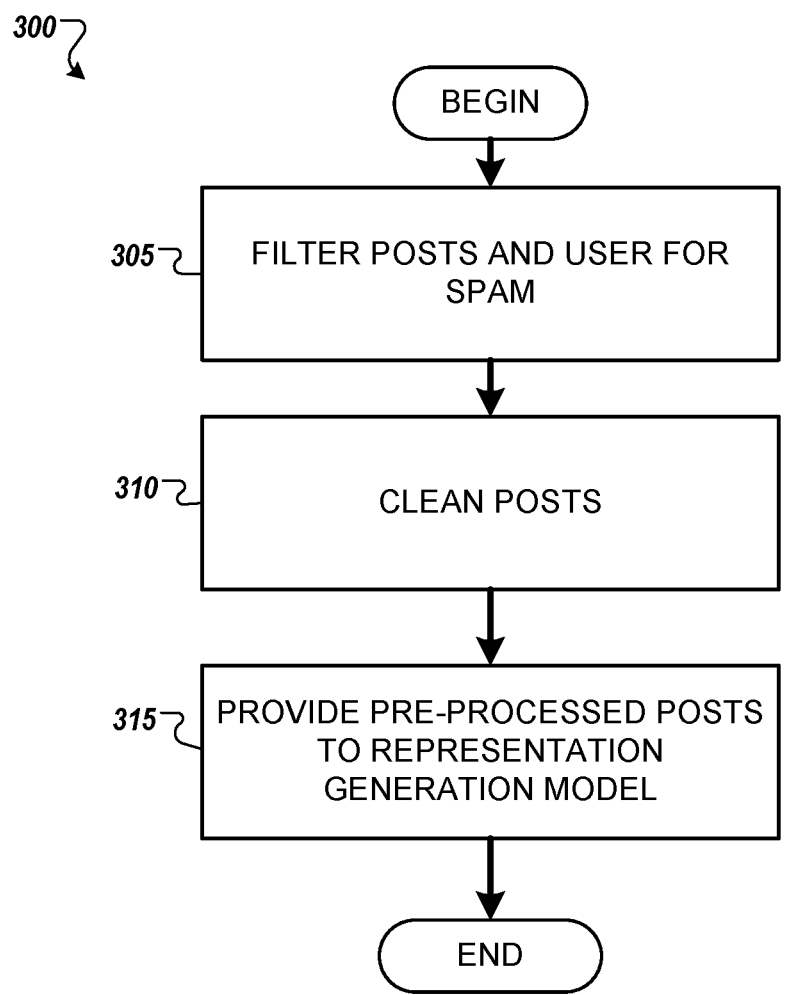
FIG. 3 illustrates a flow chart of a sub-process of pre-processing social media posts according to example implementations.

FIG. 3 illustrates a flowchart of a sub-process 300 of pre-processing social media posts according to example implementations of the present application. The illustrated process 300 may be performed by a processor (such as processor 155) of a device (such as device 135) to pre-process collected social media posts. The sub-process 300 may be used as part of a process of identifying a decision purchase stage of a user, such as process 200 of FIG. 2. In the sub-process 300, the social media posts may be first filtered to identify and remove spam related posts at 305. Spam filtering at 305 may involve identifying posts containing text or other content that has been previously identified as spam content (e.g., language that or images that has been previously identified in previous spam posts). Spam filtering at 305 may also involve looking at user names that have been identified as "spam" sources, such as social media accounts that are associated with known marketing firms, or that have previous been linked to "spam" campaigns. Other methods of identifying social media posts representative of "spam" may be apparent to a person of ordinary skill in the art. Any posts identified as "spam" may be removed from further analysis.

After "spam" posts have been filtered out, the social media posts may be cleaned to standardize for subsequent analysis at 310. In some example implementations, a script (e.g., a publically available script, such as twokenize https://github.com/myleott/ark-twokenize-py, TweetTokenizer in nltk.tokenize) may be used to tokenize and perform other basic cleaning steps, such as replacing URLs with a special token or normalizing elongated words (e.g., converting "I loooooove this product soooo much" to "I love this product so much"). In some example implementations, this cleaning may be done manually by a user or service provider. Once the social media posts have been pre-processed, the remaining social media posts may be provided to a representation generation model at 315, which performs a sub-process for generating representations as discussed below, and the sub-process 300 ends.

Figure 4:
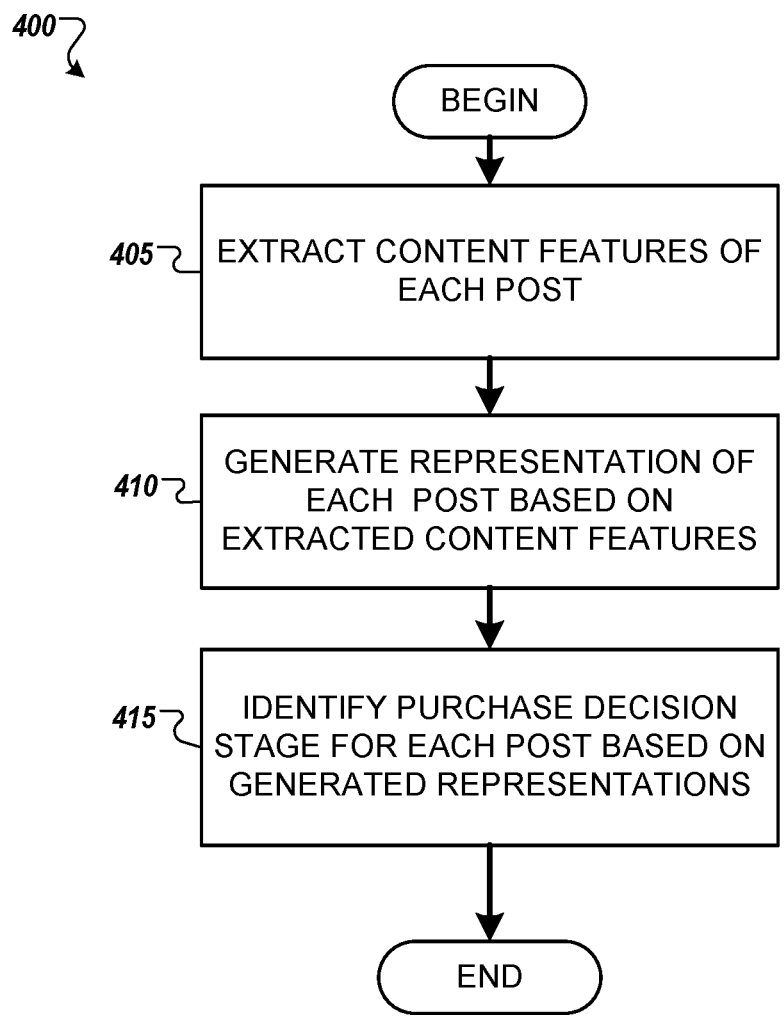
FIG. 4 illustrates a sub-process of identifying a purchase decision stage associated with each of a plurality of social media posts in accordance with example implementations.

FIG. 4 illustrates a sub-process 400 for identifying a purchase decision stage (e.g., a stage of the AIDBUN model, for example) associated with each of a plurality of social media posts in accordance with example implementations. The illustrated process 400 may be performed by a processor (such as processor 155) of a device (such as device 135) to provide identification of purchase decision stages of a plurality of collected social media posts. In some example implementations, all of the plurality of social media posts may be associated with the same user. Further, in some example implementations, the sub-process 400 may be used as part of a process to target information to a user based on an identified decision purchase stage of a user, such as process 200 of FIG. 2.

In the process 400, content features are extracted from each social media post at 405. The extraction of the content features is not particularly limited and may include applying object recognition techniques (e.g., object recognition, facial recognition, character recognition, etc.) to images or videos associated with the social media post to identify the visual content. Additionally, audio recognition techniques (e.g., audio event detection, audio characteristic classification, speech recognition, etc.) may be used to detect the audio content associated with the social media post. Additionally, subject matter recognition algorithms may be used to detect subjects or topics of textual content. The extracted content features may also include other types of features about the content such as location of capture or authorship (e.g., GPS data, etc.) or any other content features that might be apparent to a person of ordinary skill in the art. All extracted content features may be associated with a series of words (e.g., a textual description of each social media post).

At 410, a representation of each social media post may be generated based on the extracted content features or textual descriptions of each social media post. For example, in some example implementations, each word associated with the extracted content features is represented by a corresponding word embedding. Words that are not recognized may be skipped. In some example implementations, word embedding models (such as WORD2VEC) may be adapted to new data using existing tools (e.g., DEEP LEARNING TOOLS, SUCH AS THEANO OR TENSORFLOW) being applied to a corpus of word content (e.g., news sources, social medial sources, etc.).

In some example implementations, the vocabulary of the embedding dictionary algorithms may be limited to a particular vocabulary size (e.g., 100,000 words) to reduce the computational time of the neural networks.

Several different models may be used to compute the representation of each social media post (e.g., a sequence of words associated with content features of each social media post). Several different model options are discussed below and illustrated in FIG. 7.

One example model used may be a 3-gram bag-of-word vectors for non-neural networks model. In this example model, non-neural models, (e.g., support vector machine (SVM) and logistic regression (LR), bag-of-word (BOW) vectors) may be computed using the vocabulary given by the social media post embeddings. For example, 1-grams, 2-grams and 3-grams of the input posts.

Another example model may be an average over word embeddings model. This may be considered the most straightforward model for creating a social media post representation. In this model, the social media post representation is created by averaging the embeddings of the individual words associated with the content features of each social media post.

Another example model may be a convolution over word embeddings model. In this model, a convolutional neural network may be used to perform the social media representation task. This may involve applying one or more convolutional filters to the combined words associated with the content features of the social media post. Afterwards, pooling may be applied to extract the most relevant scores and obtain a fixed-length sentence representation of each social media post. In some example implementations, the pooling may be k-max pooling with k=3.

Another example model that may be used is a recurrent network over word embeddings model. In this model, a recurrent neural network may be used for the social media representation task. In some example implementations, bidirectional gated recurrent neural networks (GRU) may be applied to the word sequence associated with the content features of the social media post. The final social media representation may be a concatenation of the last forward hidden layer and the first backward hidden layer, (e.g., the two hidden layers that have seen all the words associated with each social media post). In some example implementations, GRUs may be used because they are effective as long short-term memory, and can be more efficient in training.

In other example implementations, unidirectional gated recurrent neural networks (GRU) may be applied to the word sequence associated with the content features of the social media post. The final social media representation may be the last forward hidden layer (e.g., the hidden layer that has seen all the words associated with each social media post).

In addition to these models, an attention weighting factor may be used with the above discussed models to focus on relevant input words or representations. Specifically, an attention weighting factor may be used to weight the hidden layers of the network to allow the model to focus on the most relevant input words. For an input $x_i$, we calculate the attention weight $\alpha_i$ with a softmax layer:

$$\alpha_i = \frac{\exp(V^T x_i)}{\sum_j \exp(V^T x_j)} \quad \text{(eq. 1)}$$

Where V is a parameter of the model that is initialized randomly and learned during training.

In some example implementations, a weight factor may be calculated for each hidden layer (concatenation of forward and backward hidden layer) and the weighted sum of all hidden layers may be used as the social media representation. The weights are calculated using equation 1 (eq. 1) above. Thus, $x_i$ is the $i^{th}$ hidden layer.

When using the attention weighting factor with CNNs, the pooling operation may be replaced by the attention weighting layer and the results of the convolutional operation are stored in a matrix. Column i of the matrix stores the results of applying the different convolutional filters to the i-th n-gram of the sentence. Hence, the number of rows equals the number of convolutional filters. To each column i, weight $a_i$ may be calculated based on Equation 1. Thus, $x_i$ are the values of column i. The weights are then used to calculate a weighted sum of the convolution results.

When using the attention weighting factor with GRUs, a weighting factor may be calculated for each hidden layer (concatenation of forward and backward hidden layer) and the weighted sum of all hidden layers may be used as the post representation. The weights are again calculated using Equation 1. Thus, $x_i$ is the i-th hidden layer.

Figure 8:
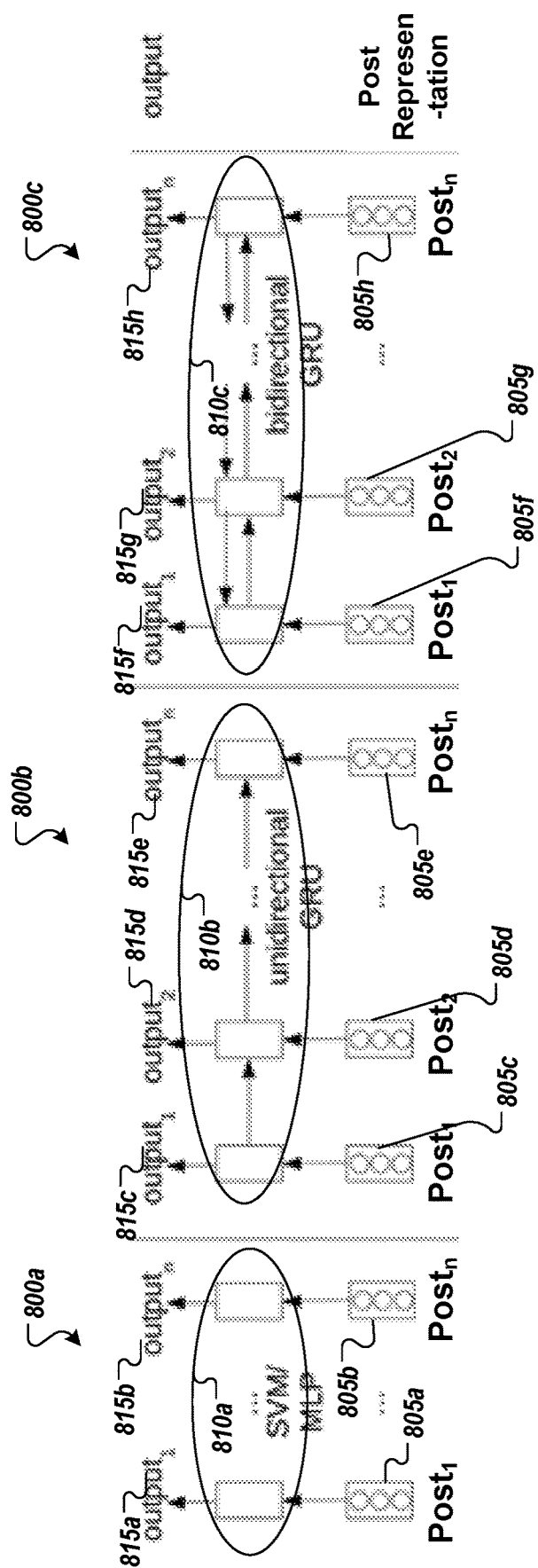
FIG. 8 illustrates schematic representations of different models that may be used to classify social media posts into purchase decision stages according to example implementations.

At 415, a purchase decision stage (e.g., the classes of the AIDBUN model) associated with each of the plurality of social media posts is identified. Several different identification models may be used in 415. Example implementations of models are illustrated in FIG. 8 below.

In some example implementations, the classes (e.g., stages) for each social media post may be determined based on each social media post individually. For example, a support vector machine (SVM), a logistic regression classifier (LR), or a feedforward model with a hidden layer (MLP) may be applied to each social media post representation individually and each social media post representation may be classified into one of the AIDBUN classes. In these example implementations, the models treat every social media post individually and do not learn patterns across a plurality of social media posts. However, after each social media post has been classified individually, the social media posts may be ordered in time sequence (e.g., the social media posts may be ordered in chronological order) to determine a user's current stage in the decision purchase process and to also determine a user's progression through the stages. For example, when did the user first become interested, when the interest becomes desire, and whether the user has purchased the product yet.

In other example implementations, the plurality of social media posts may be organized into a time sequence before classification in 415 and the classification may be performed by feeding the time sequence into a sequence model. For example, a unidirectional recurrent neural network (GRU) may be used to perform the classification of the plurality of social media posts. The unidirectional recurrent neural network may be trained with social media posts associated with a single user to allow the unidirectional recurrent neural network to learn patterns across social media posts (e.g., "a user may first express interest in a product before buying but is unlikely to express that they have purchased a product before they were interested.") Based on these trained patterns, the unidirectional GRU may classify each of the social media posts into one of the AIDBUN classes based on the generated representation of each social media post and the classification or representation associated with one or more chronologically earlier social media posts in the sequence of social media posts.

In still other example implementations, a bidirectional recurrent neural network (GRU) may be used to enrich the information available to the network by using information from both chronologically earlier and chronologically later social media posts in the sequence of social media posts to classify each social media post into one of the AIDBUN classes. In other words, for a given social media post (e.g., "middle post"), the bidirectional GRU may look at how earlier posts have been classified or represented and how later posts have been classified or represented. Based on the classifications or representations of both the earlier and later posts, the bidirectional GRU may classify the given social media post (e.g., "middle post") into a class that logically could occur between the earlier and later posts. For example, if the earlier post is classified as "aware" or "interested", and the later post is classified as "desiring", the middle post may be classified as "interested" or "desiring", but it would be unlikely to be classified as "bought", because it is unlikely that a user posts about having purchased the product before expressing desire.

In some example implementations, the collection of the plurality social media posts used may be naturally imbalanced. For example, more posts may be related to "desire" or "interest" classes than may be related to "bought" classes or a significant amount of posts may be related to the "not purchase decision stage" class. In addition, many more posts are of class 'N' than the AIDBU classes.

In some example implementations, class weights for the cross entropy loss (in combination with a softmax output layer) and/or a ranking loss (ranking output layer) may be used to compensate for the imbalanced data.

For example, if the reference is a non-artificial AIDBU class, the error of the model may be weighted (i.e. multiplied) by a misclassification cost w>1. Thus, the model may be penalized more for false negatives than for false positives. Further, in some example implementations, this weighting may be combined with gradient descent, such that the parameter updates after a false negative prediction are larger. The weight $w_i$ for class i may be calculated based on the class frequency $f_i$ with $$W_i = \frac{n}{c \cdot f_i} \quad \text{(eq. 2)}$$

With n being the total number of samples and c being the number of classes. Then, the weights are normalized so that the weight for class 'N' is 1.

Further, in some example implementations, a loss function may be used. An example implementation of the loss function may include:

$$L = \log(1+\exp(\gamma(m^+ - s_\theta(x)_{y^+}))) + \log(1+\exp(\gamma(m^- - s_\theta(x)_{c^-}))) \quad \text{(eq. 3)}$$

Where $s_\theta(x)_{y^+}$ is the score for the correct class $y^+$ and $s_\theta(x)_{c^-}$ is the score for the best competitive class $c^-$. The variables $m^+$ and $m^-$ are margins. The function aims at giving scores greater than $m^+$ for the correct class and scores smaller than $m^-$ for the incorrect classes. The scaling factor $\gamma$ helps to penalize classification errors. In some example implementations, $m^+$ may be 2.5 and $m^-$ may be 0.5 and $\gamma$ may be tuned on the development set. This loss function may be suited for artificial classes (like 'N' class discussed herein) for which it might not be possible to learn a specific pattern. For example, If $y^+ = N$, only the second summand may be evaluated. During testing, 'N' may only be predicted if the scores for all other classes are negative. This may allow the model to focus on the non-artificial classes and the loss function may compensate for data which is imbalanced between the "AIDBU" classes and the 'N' class.

After the plurality of social media posts are classified in 415, the sub-process 400 may end. If the sub-process 400 is being performed as part of a process to identify a decision purchase stage of a user, such as process 200 of FIG. 2, the process 200 may continue as discussed above.

Figure 5:
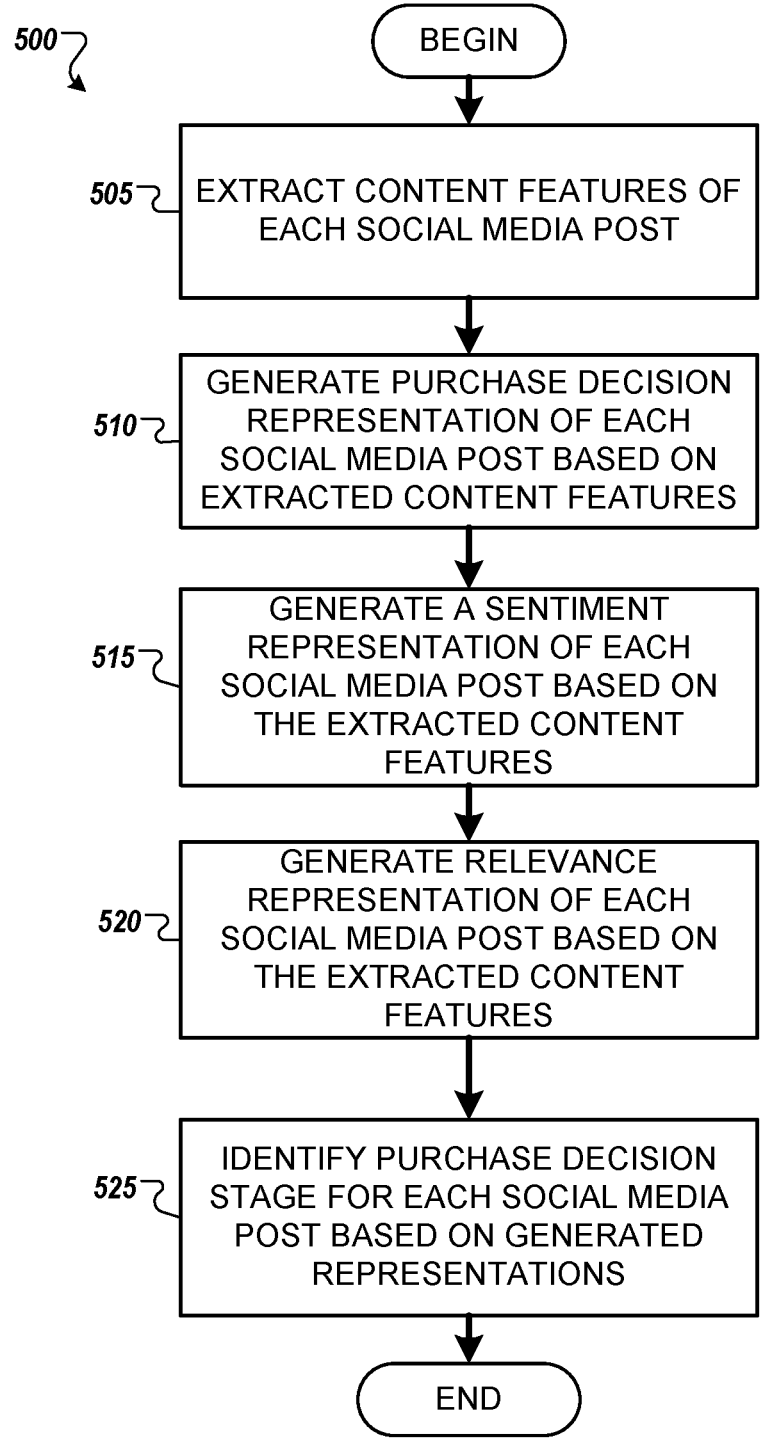
FIG. 5 illustrates a sub-process of identifying a purchase decision stage associated with each of a plurality of social media posts in accordance with example implementations.

FIG. 5 illustrates a sub-process 500 for identifying a plurality of social media posts in the purchase decision stage (e.g., AIDBUN model stage) in accordance with example implementations. The illustrated process 500 may be performed by a processor (such as processor 155) of a device (such as device 135) to identify a stage of a purchase decision process. Some aspects of the sub-process 500 may be similar to aspects of sub-process 400 discussed above. In example implementations of this sub-process, multi-task learning may be used to train network parameters more robustly using additional data. For example, sentiment data, and relevance classification data may also be used to determine the decision purchase stage associated with each social media post. In some example implementations, all of the plurality of social media posts may be associated with the same user. Further, in some example implementations, the sub-process 500 may be used as part of a process of targeting information a user based on an identified decision purchase stage of a user, such as process 200 of FIG. 2.

In the process 500, content features are extracted from each social media post at 505. The extraction of the content features is not particularly limited and may include applying object recognition techniques (e.g., object recognition, facial recognition, character recognition, etc.) to images or videos associated with the social media post to identify the visual content. Additionally, audio recognition techniques (e.g., audio event detection, audio characteristic classification, speech recognition, etc.) may be used to detect the audio content associated with the social media post. Additionally, subject matter recognition algorithms may be used to detect subjects or topics of textual content. The extracted content features may also include other types of features about the content such as location of capture or authorship (e.g., GPS data, etc.) or any other content features that might be apparent to a person of ordinary skill in the art. All extracted content features may be associated with a series of words (e.g., a textual description of each social media post). At 510, an AIDBUN representation of each social media post may be generated based on the extracted content features. For example, in some example implementations, each word associated with the extracted content features is represented by a corresponding word embedding. Words that are not recognized may be skipped. In some example implementations, word embedding models (such as WORD2VEC) may be adapted to new data using existing tools (e.g., DEEP LEARNING TOOLS, SUCH AS THEANO OR TENSORFLOW) being applied to a corpus of word content (e.g., news sources, social medial sources, etc.).

In some example implementations, the vocabulary of the embedding dictionary algorithms may be limited to a particular vocabulary size (e.g., 100,000 words) to reduce the computational time of the neural networks.

Several different models may be used to compute the representation of each social media post (e.g., a sequence of words associated with content features of each social media post). Several different model options are discussed below and illustrated in FIG. 7.

One example model used may be a 3-gram bag-of-word vectors for non-neural networks model. In this example model, non-neural models, (e.g., support vector machine (SVM) and logistic regression (LR), bag-of-word (BOW) vectors) may be computed using the vocabulary given by the social media post embeddings. For example, 1-grams, 2-grams and 3-grams of the input posts.

Another example model may be an average over word embeddings model. This may be considered the most straightforward model for creating a social media post representation. In this model, the social media post representation is created by averaging the embeddings of the individual words associated with the content features of each social media post.

Another example model may be a convolution over word embeddings model. In this model, a convolutional neural network may be used to perform the social media representation task. This may involve applying one or more convolutional filters to the combined words associated with the content features of the social media post. Afterwards, pooling may be applied to extract the most relevant scores and obtain a fixed-length sentence representation of each social media post. In some example implementations, the pooling may be k-max pooling with k=3.

Another example model that may be used is a recurrent network over word embeddings model. In this model, a recurrent neural network may be used for the social media representation task. In some example implementations, bidirectional gated recurrent neural networks (GRU) may be applied to the word sequence associated with the content features of the social media post. The final social media representation may be a concatenation of the last forward hidden layer and the first backward hidden layer, (e.g., the two hidden layers that have seen all the words associated with each social media post). In some example implementations, GRUs may be used because they are effective as long short-term memory, and can be more efficient in training.

In addition to these models, an attention weighting factor may be used with the above discussed models to focus on relevant input words or representations. Specifically, an attention weighting factor may be used to weight the hidden layers of the network to allow the model to focus on the most relevant input words. For an input $x_i$, we calculate the attention weight $\alpha_i$ with a softmax layer:

$$\alpha_i = \frac{\exp(V^T x_i)}{\sum_j \exp(V^T x_j)} \qquad \text{(eq. 1)}$$

Where V is a parameter of the model that is initialized randomly and learned during training.

In some example implementations, a weight factor may be calculated for each hidden layer (concatenation of forward and backward hidden layer) and the weighted sum of all hidden layers may be used as the social media representation. The weights are calculated using equation 1 (eq. 1) above. Thus, $x_i$ is the $i^{th}$ hidden layer.

When using the attention weighting factor with CNNs, the pooling operation may be replaced by the attention weighting layer and the results of the convolutional operation are stored in a matrix. Column i of the matrix stores the results of applying the different convolutional filters to the i-th n-gram of the sentence. Hence, the number of rows equals the number of convolutional filters. To each column i, weight $a_i$ may be calculated based on Equation 1. Thus, $x_i$ are the values of column i. The weights are then used to calculate a weighted sum of the convolution results.

When using the attention weighting factor with GRUs, a weighting factor may be calculated for each hidden layer (concatenation of forward and backward hidden layer) and the weighted sum of all hidden layers may be used as the post representation. The weights are again calculated using Equation 1. Thus, $x_i$ is the i-th hidden layer.

Further, at 515, a separate sentiment representation of each social media post may be generated based on the extracted content features using a sentiment model on a neural network trained using sentiment specific data sets. For example, in some example implementations social media based sentiment data sets (such as the SemEval 2016 sentiment analysis shared task training and development set) may be used. The sentiment model may assign each social media post a sentiment (e.g., positive, negative, or neutral) to generate a sentiment representation of each social media post. Though illustrated in FIG. 5 as subsequent to the AIDBUN model representation generation in 510, generation of the sentiment representation may occur in parallel with, or prior to the AIBUN model representation generation.

Still further, at 520, a separate relevance representation of each social media post may be generated based on the extracted content features using a relevance model on a neural network trained using relevance specific data sets. For example, in some example implementations social media based relevance data sets (such as the data in Sakaki, Chen, Korpusik, Chen. Corpus for Customer Purchase Behavior Prediction in Social Media. LREC 2016)) may be used. The relevance model may determine whether each social media post is relevant for purchase prediction. Though illustrated in FIG. 5 as subsequent to the AIDBUN model representation generation in 510, generation of the relevance representation may occur in parallel, or prior to the AIBUN model representation generation.

At 525, a purchase decision stage (e.g., the classes of the AIDBUN model) associated with each of the plurality of social media posts is identified after the representations (AIDBUN representation, Sentiment representation, and Relevance representation) of each social media post is generated. Several different classifier models may be used in 525. Example implementations of classifier models are illustrated in FIG. 8 below.

In some example implementations, the classes (e.g., stages) for each social media post may be determined based on each social media post individually. For example, a support vector machine (SVM), a logistic regression classifier (LR), or a feedforward hidden layer (MLP) may be applied to each social media post representation individually and each social media post representation may be classified into one of the AIDBUN classes. In these example implementations, the models treat every social media post individually and do not learn patterns across a plurality of social media posts. However, after each social media post has been classified individually, the social media posts may be ordered in time sequence (e.g., the social media posts may be order in chronological order) to determine a user's current stage in the decision purchase process and to also determine a user's progression through the stages. For example, when did the user first become interested, when the interest becomes desire, and whether the user has purchased the product yet.

In other example implementations, the plurality of social media posts may be organized into a time sequence before classification in 525 and the classification may be performed by feeding the time sequence into a sequence model. For example, a unidirectional recurrent neural network (GRU) may be used to perform the classification of the plurality of social media posts. The unidirectional recurrent neural network may be trained with social media posts associated with a single user to allow the unidirectional recurrent neural network to learn patterns across social media posts (e.g., "a user may first express interest in a product before buying but is unlikely to express that they have purchased a product before they were interested.") Based on these trained patterns, the unidirectional GRU may classify each of the social media posts into one of the AIDBUN classes based on the generated representation of each social media post and the classification or representation associated with one or more chronologically earlier social media posts in the sequence of social media posts.

In still other example implementations, a bidirectional recurrent neural network (GRU) may be used to enrich the information available to the network by using information from both chronologically earlier and chronologically later social media posts in the sequence of social media posts to classify each social media post into one of the AIDBUN classes. In other words, for a given social media post (e.g., "middle post"), the bidirectional GRU may look at how earlier posts have been classified or the represented and how later posts have been classified or represented. Based on the classifications or representations of both the earlier and later posts, the bidirectional GRU may classify the given social media post (e.g., "middle post") into a class that logically could occur between the earlier and later posts. For example, if the earlier post is classified as "aware" or "interested", and the later post is classified as "desiring", the middle post may be classified as "interested" or "desiring", but not "bought", because it is unlikely that a user posts about having purchased the product before expressing desire.

In some example implementations, the collection of the plurality social media posts used may be naturally imbalanced. For example, more posts may be related to "desire" or "interest" classes than may be related to "bought" classes or a significant amount of posts may be related to the "not purchase decision stage" class.

In some example implementations, class weights for the cross entropy loss (in combination with a softmax output layer) and/or a ranking loss (ranking output layer) may be used to compensate for the imbalanced data.

For example, if the reference is a non-artificial AIDBU class, the error of the model may weighted (i.e. multiplied) by a misclassification cost w>1. Thus, the model may be penalized more for false negatives than for false positives. Further, in some example implementations, this weighting may be combined with gradient descent, such that the parameter updates after a false negative prediction are larger. The weight $w_i$ for class i may be calculated based on the class frequency $f_i$ with $$w_i = \frac{n}{c \cdot f_i} \quad \text{(eq. 2)}$$

With n being the total number of samples and c being the number of classes. Then, the weights are normalized so that the weight for class 'N' is 1.

Further, in some example implementations, a loss function may be used. An example implementation of the loss function may include:

$$L=\log(1+\exp(\gamma(m^+-s_\theta(x)_{y^+})))+\log(1+\exp(\gamma(m^--s_\theta(x)_{c^-}))) \quad \text{(eq. 3)}$$

Where $s_\theta(x)_{y^+}$ is the score for the correct class $y^+$ and $s_\theta(x)_{c^-}$ is the score for the best competitive class $c^-$. The variables $m^+$ and $m^-$ are margins. The function aims at giving scores greater than $m^+$ for the correct class and scores smaller than $m^-$ for the incorrect classes. The scaling factor $\gamma$ helps to penalize classification errors. In some example implementations, $m^+$ may be 2.5 and $m^-$ may be 0.5 and $\gamma$ may be tuned on the development set. This loss function may be suited for artificial classes (like 'N' class discussed herein) for which it might not be possible to learn a specific pattern. For example, If $y^+=N$, only the second summand may be evaluated. During testing, 'N' may only be predicted if the scores for all other classes are negative. This may allow the model to focus on the non-artificial classes and the loss function may compensate for data which is imbalanced between the "AIDBU" classes and the 'N' class.

For multitask learning, the neural network for the sentiment classification and the neural network for the relevance classification may share all the layers from the input of the AIDBUN representation networks discussed below with respect to FIG. 8. The social media representations may then be fed into individual sentiment task-specific and relevance task-specific softmax layers, which make sentiment task and relevance task specific classifications. In some example implementations, the ordering of training of the neural network for sentiment classification and relevance specific classifications may be performed with one batch of data for the sentiment or relevance classification and then two batches of data for the AIDBUN main task. In each step, the second task may be chosen randomly. In other example implementations, the second task may always be the same task.

The combined classifications of sentiment and relevance classification may be used to refine the AIDBUN classifications determined based on the AIDBUN representations generated in 510.

After the plurality of social media posts are classified in 525, the sub-process 500 may end. If the sub-process 500 is being performed as part of a process to identify a decision purchase stage of a user, such as process 200 of FIG. 2, the process 200 may continue as discussed above.

Figure 6:
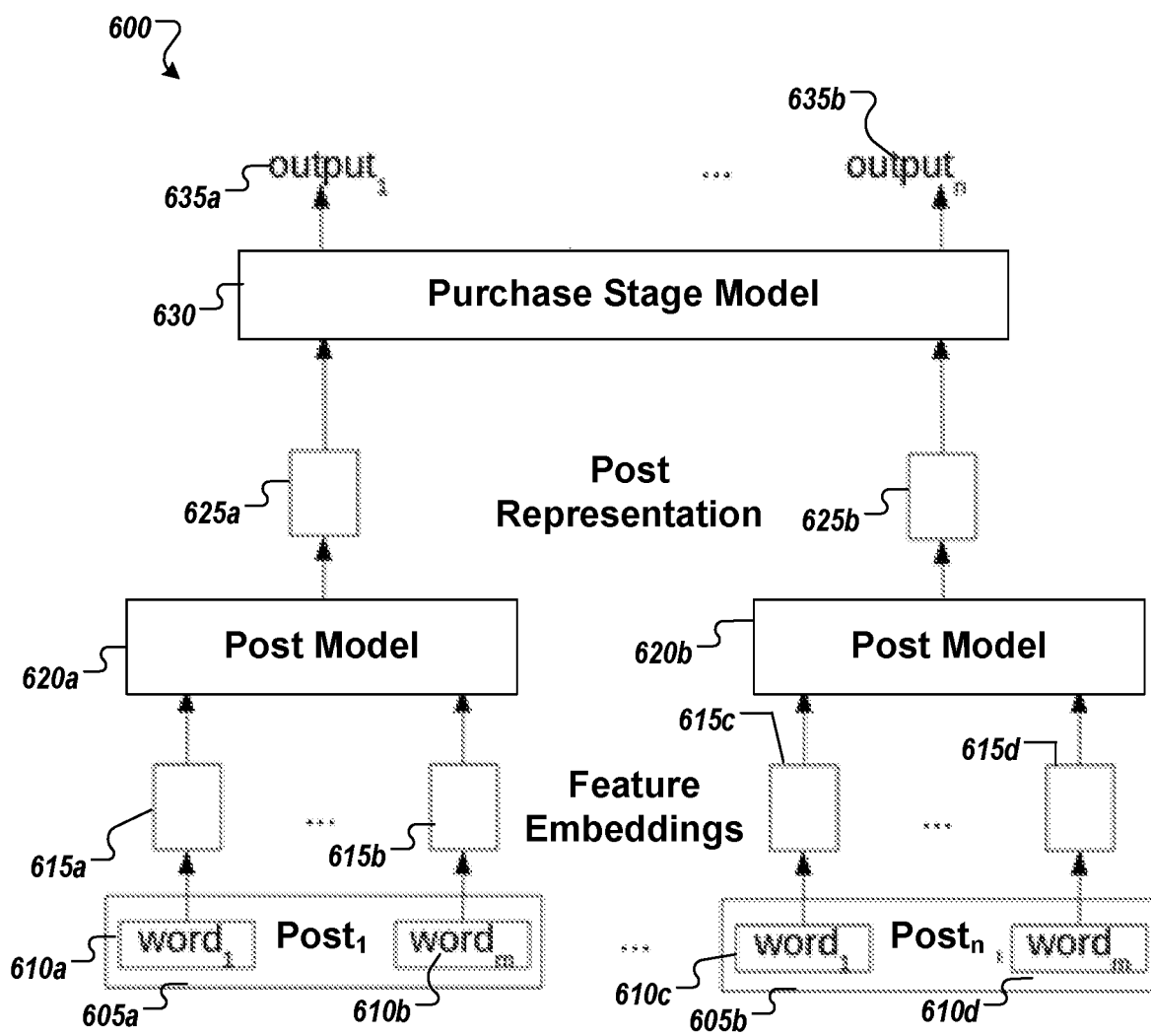
FIG. 6 illustrates a schematic representation of a hierarchical neural network-based purchase identification model according to example implementations.

FIG. 6 illustrates a schematic representation of a hierarchical neural network-based purchase identification model 600 according to example implementations. As illustrated, the model has as an input of a plurality of social media posts 605a/605b. In some example implementations, the social media posts may be posts to a microblog social media environment. For example, but not by way of limitation, the microblog may include TWITTER, TUMBLR, TOUT, TENCENT Weibo or any other microblogging platform that may be apparent to a person of ordinary skill in the art. However, example implementations of social media posts are not limited to microblogs, and may be any type of social media post that might be apparent to a person of ordinary skill in the art.

Each social media post 605a, 605b may be made up a plurality of words or content features 610a/610b/610c/610d that can be extracted as discussed above with respect to FIGS. 4 and 5. Though only two content features or words are illustrated in FIG. 6, more than two content features or words may be extracted from each post in some example implementations. Feature embeddings 615*a*/615*b*/615*c*/615*d* may be generated based on each content feature 610*a*/610*b*/610*c*/610*d*. For example, in some example implementations, each word associated with the extracted content features 610*a*/610*b*/610*c*/610*d* may be represented by a corresponding word embedding. Words that are not recognized may be skipped. In some example implementations, word embedding models may be trained using existing tools (such as word2vec) being applied to a corpus word content (e.g., news sources, social medial sources, etc.). In some example implementations, the vocabulary of the embedding dictionary algorithms may be limited to a particular vocabulary size (e.g., 100,000 words) to reduce the computation time of the neural networks.

The feature embeddings 615*a*/615*b*/615*c*/615*d* associated with each post 605*a*, 605*b* may be applied to post representation model 620*a*/620*b* to generate a social media post representation 625*a*/625*b* for each social media post. Example implementations of the post representation models 620*a*/620*b* are illustrated in FIG. 7 below.

The social media post representations 625*a*/625*b* for each social media post may be provided to a shared purchase stage model 630 that produces a purchase stage output 635*a*/635*b* based on each social media post representation 625*a*/625*b* received. Example implementations of the shared purchase stage model 630 are illustrated in FIG. 8 below.

Figure 7:
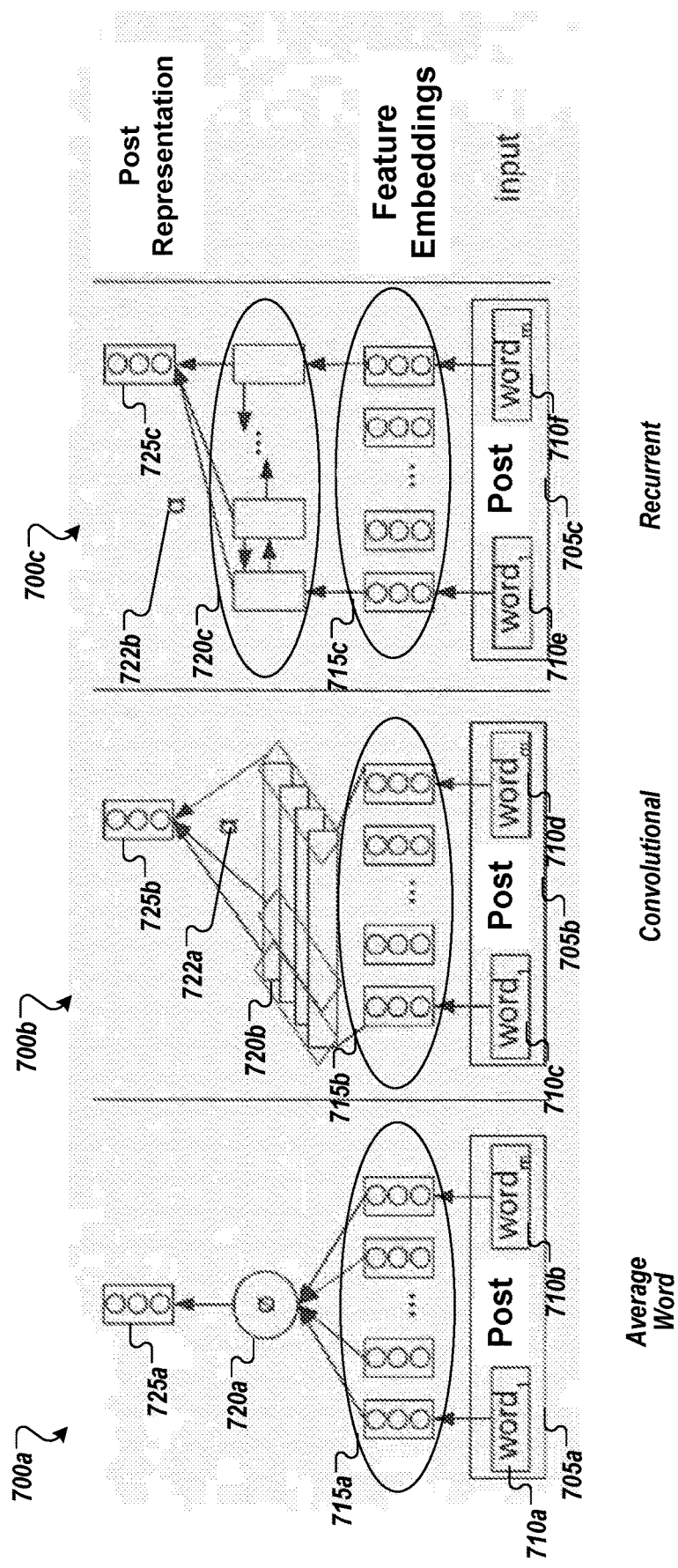
FIG. 7 illustrates schematic representations of different models that may be used to generate a representation of a social media post according to example implementations.

FIG. 7 illustrates schematic representations of different models 700*a*/700*b*/700*c* that may be used to generate a representation of a social media post 705*a*/705*b*/705*c* according to example implementations. Example implementations are not limited to these models and other models may be apparent to a person of ordinary skill in the art.

Model 700*a* is illustrated as an average over word embeddings model. In this model, each post 705*a* is divided into content words or features 710*a*/710*b*. Though only two content features or words are illustrated, more than two content features or words may be extracted from each post in some example implementations. Feature embeddings 705*a* may be generated based on each content feature or word 710*a*/710*b*. For example, each word associated with the extracted content features 710*a*/710*b* may be represented by a corresponding word embedding. Words that are not recognized may be skipped. In some example implementations, word embedding models (such as WORD2VEC) may be adapted to new data using existing tools (e.g., DEEP LEARNING TOOLS, SUCH AS THEANO OR TENSORFLOW) being applied to a corpus of word content (e.g., news sources, social medial sources, etc.).

In some example implementations, the vocabulary of the embedding dictionary algorithms may be limited to a particular vocabulary size (e.g., 100,000 words) to reduce the computation time of the neural networks.

Once the embeddings 715*a* are generated for each word or feature 710*a*/710*b* of the post 705*a*, the embeddings 715*a* may be input into an averaging function 720*a* that creates a social media post representation 725*a* by averaging the embeddings 715*a* of the individual words or features 710*a*/710*b* of the social media post 705*a*.

Model 700*b* is illustrated as a convolution over word embeddings model. In this model, each post 705*b* is divided into content words or features 710*c*/710*d*. Though only two content features or words are illustrated, more than two content features or words may be extracted from each post in some example implementations. Feature embeddings 715*b* may be generated based on each content feature or word 710*c*/710*d*. For example, in some example implementations, each word associated with the extracted content features 710*c*/710*d* may be represented by a corresponding word embedding. Words that are not recognized may be skipped. In some example implementations, word embedding models (such as WORD2VEC) may be adapted to new data using existing tools (e.g., DEEP LEARNING TOOLS, SUCH AS THEANO OR TENSORFLOW) being applied to a corpus of word content (e.g., news sources, social medial sources, etc.).

In some example implementations, the vocabulary of the embedding dictionary algorithms may be limited to a particular vocabulary size (e.g., 100,000 words) to reduce the computation time of the neural networks.

Once the embeddings 715*b* are generated for each word or feature 710*c*/710*d* of the post 705*b*, the embeddings 715*b* may be input into a convolutional neural network 720*b* to create a social media post representation 725*b*. This may involve applying one or more convolutional filters to the embeddings 715*b* associated with the content features 710*c*/710*d* of the social media post 705*b*. Additionally, in some example implementations, an attention (a) weighting factor 722*a* may be used to focus on relevant input features 710*c*/710*d*. Use of attention (a) weighting factors is discussed in greater detail above with respect to FIGS. 4 and 5.

Model 700*c* is illustrated as a recurrent network over word embeddings model. In this model, each post 705*c* is divided into content words or features 710*e*/710*f*. Though only two content features or words are illustrated, more than two content features or words may be extracted from each post in some example implementations. Feature embeddings 715*c* may be generated based on each content feature or word 710*e*/710*f*. For example, in some example implementations, each word associated with the extracted content features 710*e*/710*f* may be represented by a corresponding word embedding. Words that are not recognized may be skipped. In some example implementations, word embedding models (such as WORD2VEC) may be adapted to new data using existing tools (e.g., DEEP LEARNING TOOLS, SUCH AS THEANO OR TENSORFLOW) being applied to a corpus of word content (e.g., news sources, social medial sources, etc.).

In some example implementations, the vocabulary of the embedding dictionary algorithms may be limited to a particular vocabulary size (e.g., 100,000 words) to reduce the computation time of the neural networks.

Once the embeddings 715*c* are generated for each word or feature 710*e*/710*f* of the post 705*c*, the embeddings 715*c* may be input into a recurrent neural network 720*c* to create a social media post representation 725*c*. This may involve applying bidirectional gated recurrent neural networks (GRU) to the word sequence associated with the content features 710*e*/710*f* of the social media post 705*c*. The final social media representation 725*c* may be a concatenation of the last forward hidden layer and the first backward hidden layer, (e.g., the two hidden layers that have seen all the words associated with the social media post). In some example implementations, GRUs may be used because they are effective as long short-term memory, and may be more efficient in training. Additionally, in some example implementations, an attention (a) weighting factor 722*b* may be used to focus on relevant input features 710*e*/710*f*. Use of attention (a) weighting factors is discussed in greater detail above with respect to FIGS. 4 and 5.

FIG. 8 illustrates schematic representations of different models 800*a*/800*b*/800*c* that may be used to identify social media posts into purchase decision stages based on a representation 805a/805b/805c/805d/805e/805f/805g of a social media post according to example implementations. Example implementations are not limited to these models and other models may be apparent to a person of ordinary skill in the art.

Model 800a is illustrated as a model that may identify the classes for each social media post based on each social media post individually. Examples of this model may include: a support vector machine (SVM), a logistic regression classifier (LR), or a feedforward hidden layer (MLP). In the model 800a, each social media post representation 805a/805b is individually provided to an identifier 810a (e.g., a support vector machine (SVM), a logistic regression classifier (LR), or a feedforward hidden layer (MLP)). The identifier 810a then analyzes each post representation 805a/805b. Though only two content post representations 805a/805b are illustrated, more than two post representation 805a/805b may be provided to the identifier 810a in some example implementations.

Based on each post representation 805a/805b individually, the identifier 810a generates an AIDBUN class output 815a and 815b. Thus, the model 800a treats every social media post individually and does not learn patterns across social media posts. However, after each social media post has been classified individually, the social media posts may be ordered in time sequence (e.g., the social media posts may be order in chronological order) to determine a user's current stage in the decision purchase process and to also determine a user's progression through the stages in some example implementations. For example, when did the user first become interested, when did the interest becomes desire, and whether the user has purchased the product yet.

Model 800b is illustrated as a unidirectional recurrent neural network (GRU) that may be used to perform the identification of the plurality of social media post representations 805c/805d/805e in chronological order using information from earlier posts (e.g., 805c/805d) to assist the identification of later occurring posts (e.g., 805d/805e). As illustrated, the plurality of social media post representations 805c/805d/805e are provided to the identifier 810b that analyzes the representations 805c/805d/805e in sequence. Though only three content post representations 805c/805d/805e are illustrated, more than three post representations 805c/805d/805e may be provided to the identifier 810b in some example implementations. In the unidirectional recurrent neural network of model 800b, the identifier 810b may be trained with social media posts associated with a single user to allow the unidirectional recurrent neural network identifier 810b to learn patterns across social media posts (e.g., "a user may first express interest in a product before buying but is unlikely to express that they have purchased a product before then were interested.") Based on these trained patterns, the unidirectional GRU identifier 810b may generate individual outputs 815c/815d/815e that identify one of the AIDBUN classes associated with each of representations 805c/805d/805e based on the generated representation of each social media post and the representation associated with one or more chronologically earlier social media posts in the sequence of social media posts.

Model 800c is illustrated as a bidirectional recurrent neural network (GRU) that uses information from both chronologically earlier and chronologically later social media posts in the sequence of social media posts to identify the purchase stage based on the plurality of social media post representations 805f/805g/805e in chronological order. As illustrated, the plurality of social media post representations 805f/805g/805h are provided to the identifier 810c that analyzes the representations 805f/805g/805h in sequence. Though only three content post representations 805f/805g/805h are illustrated, more than three post representations 805f/805g/805h may be provided to the identifier 810c in some example implementations. In the bidirectional recurrent neural network of model 800c, the identifier 810c may, for a given social media post (e.g., "middle post" 805g), look at how the representation of at least one earlier post (805f) and how the representation of at least one later post (805g) has been classified (e.g., the decision purchase stage identified). Based on the purchase stages identified as associated with both the earlier and later posts, the bidirectional GRU identifier 810c may identify the purchase stage associated with the given social media post (e.g., "middle post") as a stage that may logically occur between the earlier post 805f and the later post 805h. For example, if the earlier post is associated with stages "aware" or "interested", and the staged associated with a later post is identified as "desiring", the stage associated with middle post may be identified as "interested" or "desiring", but not "bought", because it is unlikely that a user posts about having purchased the product before expressing desire. The identifications of the identifier 810c may be output as separate outputs 815f/815g/815h based on each representation 805f/805g/805h.

Evaluation of Example Implementations

Evaluation Dataset

Microblog posts by users who had mentioned one of three mobile devices, (e.g., a phone, tablet or smart watch) were collected and pre-filtered for spam (See FIG. 3). After filtering, 3000 users were randomly selected for use in evaluation and their microblog posts were annotated for the AIDBUN model by two annotators. To speed up the annotation process, a user's microblog posts were classified to identify those with very high probability of being 'N' so that the annotators need not label them. The class distribution was determined to be: A=0.23%, 1=0.65%, D=1.11%, B=0.90%, U=0.50% and N=96.61%. Additionally, the A labels were mapped to N labels because there were so few A labels, and the models were not trained to identify A labels.

During the evaluation, the input to the models was temporally-ordered microblog post sequences associated with a user. Each microblog post was preprocessed to remove microblog-specific noise such as elongation of words and inconsistent tokenization (e.g., cleaned as discussed in FIG. 3).

Evaluation Experiments

Table 1 below illustrates neural and non-neural microblog representations and microblog models that did and did not use context associations. Additionally, different loss functions were compared.

As illustrated, it was observed that adding class weights may help the SVM model, while using ranking as the loss function may help the neural models more than class weights. Additionally, it is observed that the unidirectional-GRU outperformed the bidirectional-GRU on the test set. Further, the bidirectional-GRU may be a more powerful model that can look forwards as well as backwards, but also requires more parameters to train. However, with more training data the bidirectional-GRU may outperform the unidirectional-GRU in some example implementations. Additionally, the neural models may outperform the SVM. Further, it was observed that a bidirectional-GRU+attention model may outperform a bidirectional-GRU model without attention.

TABLE 1

MACRO F1 (IN %) COMPARING POST REPRESENTATION,
POST SEQUENCE REPRESENTATIONS AND METHODS
FOR DEALING WITH CLASS IMBALANCE

| POST REP | POST SEQUENCE MODEL | LOSS FUNCTION | DEV | TEST |
|---|---|---|---|---|
| BOW | SVM | SH | 43.03 | 43.97 |
| BOW | SVM | SH + weights | 46.27 | 50.89 |
| Bi-GRU + att | Bi-GRU | CE | 44.14 | 46.82 |
| Bi-GRU + att | Bi-GRU | CE + weights | 46.07 | 43.86 |
| Bi-GRU + att | Bi-GRU | ranking | 50.56 | 48.35 |
| Bi-GRU + att | unidirectional-GRU | ranking | 49.52 | 50.75 |
| CNN | Bi-GRU | CE | 47.30 | 45.50 |
| CNN | Bi-GRU | CE + weights | 49.66 | 46.27 |
| CNN | Bi-GRU | ranking | 51.21 | 47.41 |
| CNN | unidirectional-GRU | CE | 48.71 | 48.43 |
| CNN | unidirectional-GRU | CE + weights | 49.88 | 49.01 |
| CNN | unidirectional-GRU | ranking | 52.09 | 51.03 |

Table 2 below illustrates the results of multitask learning for both neural micro-blog representation models discussed above. Again, the bidirectional-GRU post sequence model was used and either sentiment analysis, relevance classification or both as a second task during training was added. In addition to the macro F1 score, class-wise F1 scores were also evaluated to see which classes may be most improved by multitask learning. As illustrated, sentiment analysis may mainly help the 'U' class, which is reasonable since it is the only class with a negative sentiment. Additionally, relevance classification may especially improve T and 'U', the two classes with least data.

Although multitask learning may improve performance, using both sentiment analysis and relevance classification as a second task did not lead to further improvements. This may be due to the networks not seeing enough examples of the different tasks since for each batch, one of the second tasks (sentiment analysis or relevance analysis was picked randomly) instead of using both.

TABLE 2

CLASS-WISE AND MACRO F1 SCORES (IN %)
ON TEST SET FOR MULTITASK LEARNING WITH
DIFFERENT SECONDARY TASKS

| POST REP | SECOND TASK | I | D | B | U | MACRO |
|---|---|---|---|---|---|---|
| GRU + att | — | 40.00 | 58.37 | 59.22 | 35.79 | 48.35 |
| GRU + att | sentiment | 30.89 | 58.86 | 60.10 | 41.32 | 47.79 |
| GRU + att | relevance | 42.70 | 55.73 | 60.42 | 38.66 | 49.37 |
| GRU + att | sent + rel | 38.57 | 54.81 | 64.00 | 37.91 | 48.82 |
| CNN | — | 32.00 | 60.51 | 57.14 | 40.00 | 47.41 |
| CNN | sentiment | 34.92 | 58.18 | 61.54 | 42.19 | 49.21 |
| CNN | relevance | 42.18 | 57.81 | 58.20 | 35.40 | 48.40 |
| CNN | sent + rel | 43.64 | 60.00 | 58.41 | 33.66 | 48.93 |

Table 3 below illustrates a confusion matrix for the CNN post representation with unidirectional GRU sequence model. Apart from confusions with the 'N' class, which most probably result from the class imbalance, the model mainly confuses neighboring labels, such as 'I' and 'D' or 'D' and 'B'. In total, over 90% of the confusions involve the 'N' class. This may show that the model may be reasonably good at distinguishing the purchase stages and that the main difficulty may be class imbalance.

TABLE 3

CONFUSION MATRIX ON THE TEST SET
FOR CNN POST REPRESENTATIONS AND
UNIDIRECTIONAL GRU SEQUENCE MODEL

| | hypo | | | | |
|---|---|---|---|---|---|
| ref | N | I | D | B | U |
| N | 1853 | 16 | 19 | 19 | 27 |
| I | 52 | 31 | 6 | 0 | 0 |
| D | 61 | 8 | 75 | 1 | 0 |
| B | 44 | 2 | 5 | 60 | 1 |
| U | 37 | 0 | 2 | 0 | 22 |

In the above evaluations, the models were trained using posts related to mobile products. To investigate the applicability of the models to another product category, a small set of posts about cars was also collected. Since microblog users often use product specific terms (e.g. a user expresses desire with "won't stop till I'm driving a XX"), adapting the trained model to a new product category may present a domain adaptation problem. For evaluation purposes, car posts were divided into a training set and a test set and the different performances when training new models only on the car training set versus re-training the previous models on the car domain was investigated.

Table 4 below illustrates the results on the car post investigation. For the neural networks, re-training the models on the car training set may give the best performance by a large margin. The bidirectional GRU sequence model may outperform the unidirectional GRU in this setup. Also, the re-trained neural networks may clearly outperform the SVM. These observations may illustrate that the neural networks can capture the signals indicative to purchase stages and may be superior to traditional models with more training data.

TABLE 4

MACRO F1 (IN %) ON CAR POST TEST SET

| POST REP | POST SEQUENCE MODEL | ADAPTATION METHOD | TEST |
|---|---|---|---|
| BOW | SVM | no adaptation | 27.07 |
| BOW | SVM | train new model on car | 32.38 |
| BOW | SVM | train model on mobile + car | 39.12 |
| CNN | Unidirectional GRU | no adaptation | 32.78 |
| CNN | Unidirectional GRU | train new model on car | 34.74 |
| CNN | Unidirectional GRU | re-train on car | 40.12 |
| CNN | Bidirectional GRU | no adaptation | 33.77 |
| CNN | Bidirectional GRU | train new model on car | 34.13 |
| CNN | Bidirectional GRU | re-train on car | 41.08 |
| GRU + att | Unidirectional GRU | no adaptation | 30.40 |
| GRU + att | Unidirectional GRU | re-train on car | 35.27 |
| GRU + att | Bidirectional GRU | no adaptation | 32.13 |
| GRU + att | Bidirectional GRU | train new model on car | 23.55 |
| GRU + att | Bidirectional GRU | re-train on car | 40.54 |

Example Computing Environment

Figure 9:
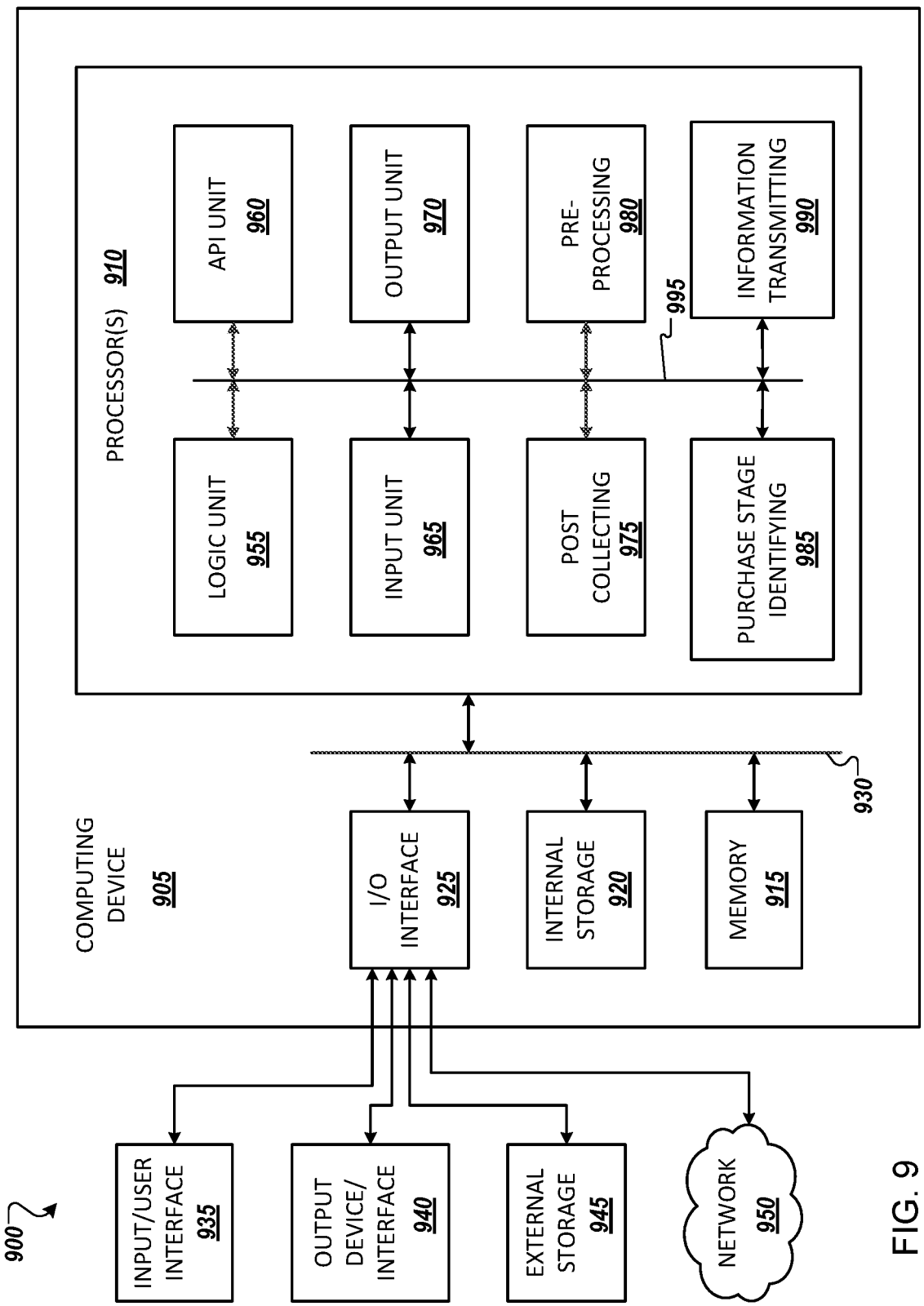
FIG. 9 illustrates an example computing environment with an example computer device suitable for use in some example implementations.

FIG. 9 illustrates an example computing environment 900 with an example computer device 905 suitable for use in some example implementations. Computing device 905 in computing environment 900 can include one or more processing units, cores, or processors 910, memory 915 (e.g., RAM, ROM, and/or the like), internal storage 920 (e.g., magnetic, optical, solid state storage, and/or organic), and/or I/O interface 925, any of which can be coupled on a communication mechanism or bus 930 for communicating information or embedded in the computing device 905.

Computing device 905 can be communicatively coupled to input/user interface 935 and output device/interface 940. Either one or both of input/user interface 935 and output device/interface 940 can be a wired or wireless interface and can be detachable. Input/user interface 935 may include any device, component, sensor, or interface, physical or virtual, which can be used to provide input (e.g., buttons, touch-screen interface, keyboard, a pointing/cursor control, microphone, camera, braille, motion sensor, optical reader, and/or the like). Output device/interface 940 may include a display, television, monitor, printer, speaker, braille, or the like. In some example implementations, input/user interface 935 and output device/interface 940 can be embedded with or physically coupled to the computing device 905. In other example implementations, other computing devices may function as or provide the functions of input/user interface 935 and output device/interface 940 for a computing device 905.

Examples of computing device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 905 can be communicatively coupled (e.g., via I/O interface 925) to external storage 945 and network 950 for communicating with any number of networked components, devices, and systems, including one or more computing devices of the same or different configuration. Computing device 905 or any connected computing device can be functioning as, providing services of, or referred to as a server, client, thin server, general machine, special-purpose machine, or another label.

I/O interface 925 can include, but is not limited to, wired and/or wireless interfaces using any communication or I/O protocols or standards (e.g., Ethernet, 802.11x, Universal System Bus, WiMAX, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computing device 905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 910 can execute under any operating system (OS) (not shown), in a native or virtual environment. One or more applications can be deployed that include logic unit 955, application programming interface (API) unit 960, input unit 965, output unit 970, post collecting unit 975, pre-processing unit 980, purchase stage calculating unit 985, information transmitting unit 990, and inter-unit communication mechanism 995 for the different units to communicate with each other, with the OS, and with other applications (not shown). For example, post collecting unit 975, pre-processing unit 980, purchase stage calculating unit 985, information transmitting unit 990 may implement one or more processes shown in FIGS. 2-5. The described units and elements can be varied in design, function, configuration, or implementation and are not limited to the descriptions provided.

In some example implementations, when information or an execution instruction is received by API unit 960, it may be communicated to one or more other units (e.g., logic unit 955, input unit 965, output unit 975, post collecting unit 975, pre-processing unit 980, purchase stage calculating unit 985, information transmitting unit 990). For example, when a social media post is collected by the post collecting unit 975 via the input unit 965, the post collecting unit 975 may provide the collected post(s) to the pre-processing unit 980. Once the post has been pre-processed by the pre-processing unit 980, the posts may be provided to the purchase stage classifying unit 985 to be classified. Based on the purchase stage classification by the purchase stage classifying unit 985, the information transmitting unit 990 may transmit information about the reference product using the output unit 970.

In some instances, the logic unit 955 may be configured to control the information flow among the units and direct the services provided by API unit 960, input unit 965, output unit 970, post detecting unit 975, post collecting unit 975, pre-processing unit 980, purchase stage calculating unit 985, and information transmitting unit 990 in some example implementations described above. For example, the flow of one or more processes or implementations may be controlled by logic unit 955 alone or in conjunction with API unit 960.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

Additionally, though example implementations of the present application are discussed in the context of a social media environment, example implementations are not limited to this context and may be used in any digital or web enabled posting board environment shared by one or more users that might be apparent to a person of ordinary skill in the art. For example, some example implementations may include a secured digital posting board accessible within a company by employees or contractors and also accessible by customers, but private from other outside users. Other example implementations may include an online customer service center that allows users to post regarding issues with products and receive real-time or time-shifted (e.g., delayed) customer support.

What is claimed is:

1. A method of targeting information, the method comprising:
   collecting one or more digital posts that identify a product and are associated with a digital account;
   identifying, by a neural network, a stage of a decision model associated with each of the one or more digital posts based on a feature representation generated for each digital post; and
   transmitting product-related information to the digital account, wherein the transmitting is based on the stage of the decision model identified for each of the one or more digital posts,
   wherein the identifying the stage of the decision model comprises:
      generating, by another neural network, a feature representation associated with each of the one or more digital posts based on at least one content feature associated with each of the one or more digital posts, the other neural network being different from the neural network; and
      identifying the stage of the decision model based on the generated feature representation associated with each of the one or more digital post.

2. The method of claim 1, further comprising pre-processing the one or more digital posts prior to identifying the stage of the decision model associated with the one or more digital posts, wherein the pre-processing comprises at least one of:
   filtering the one or more digital posts to remove at least one digital post indicative of spam; and
   cleaning at least one digital posts to remove inconsistent tokenization and irregular elongation of media content.

3. The method of claim 1, wherein the identifying the stage of the decision model comprises:
   extracting the at least one content feature associated with each of the one or more digital posts.

4. The method of claim 1, wherein the identifying the stage of the decision model further comprises at least one of:
   generating a sentiment representation associated with each of the one or more digital posts based on the at least one content feature associated with each of the one or more digital posts and identifying the stage of the decision model based on the generated sentiment representation and the generated feature representation associated with each of the one or more digital posts; and
   generating a relevance representation associated with each of the one or more digital posts based on the at least one content feature associated with each of the one or more digital posts and identifying the stage of the decision model based on the generated relevance representation and the generated feature representation associated with each of the one or more digital posts.

5. The method of claim 1, wherein the neural network is a unidirectional gated recurrent neural network;
   wherein the one or more digital posts comprises a chronological sequence of digital posts comprising:
   a first post associated with a first posting time; and
   a second post associated with a second posting time after the first posting time; and
   wherein, the identifying the stage of the decision model comprises:
      identifying the stage of the decision model stage associated with the second post based on the feature representation associated with the first post and the feature representation associated with the second post.

6. The method of claim 1, wherein the neural network is a bidirectional gated recurrent neural network;
   wherein the one or more digital posts comprises a chronological sequence of digital posts comprising:
   a first post associated with a first posting time;
   a second post associated with a second posting time after the first posting time; and
   a third post associated with a third posting time after the first positing time and after the second posting time; and
   wherein, the identifying the stage of the decision model comprises
      identifying the stage of the decision model associated with the second post based on the feature representation associated with the first post, the feature representation associated with the second post, and the feature representation associated with the third post.

7. The method of claim 1, wherein the stages of decision model comprise one or more of:
   an awareness stage;
   an interested stage;
   a desire stage;
   an action stage;
   a negative sentiment stage; and
   a not relevant stage.

8. The method of claim 1, the identifying, by the neural network, a stage of a decision model associated with each of the one or more digital posts comprises: using ranking of classes as a loss function to allow the neural network to compensate for class imbalances.

9. A non-transitory computer readable medium having stored therein a program for making a computer execute a method of targeting information, the method comprising:
   collecting one or more digital posts that identify a product and are associated with a digital account;
   identifying, by a neural network, a stage of a decision model associated with each of the one or more digital posts based on a feature representation generated for each digital post; and
   transmitting product-related information to the digital account, wherein the transmitting is based on the stage of the decision model identified for each of the one or more digital posts,
   wherein the identifying the stage of the decision model comprises:
      generating, by another neural network, a feature representation associated with each of the one or more digital posts based on at least one content feature associated with each of the one or more digital posts, the other neural network being different from the neural network; and
      identifying the stage of the decision model based on the generated feature representation associated with each of the one or more digital post.

10. The non-transitory computer readable medium of claim 9, further comprising pre-processing the one or more digital posts prior to identifying the stage of the decision model associated with the one or more digital posts, wherein the pre-processing comprises at least one of:
   filtering the one or more digital posts to remove at least one digital post indicative of spam; and
   cleaning at least one digital posts to remove inconsistent tokenization and irregular elongation of media content.

11. The non-transitory computer readable medium of claim 9, wherein the identifying the stage of the decision model comprises:
  extracting the at least one content feature associated with each of the one or more digital posts.

12. The non-transitory computer readable medium of claim 9, wherein the identifying the stage of the decision model further comprises at least one of:
  generating a sentiment representation associated with each of the one or more digital posts based on the at least one content feature associated with each of the one or more digital posts and identifying the stage of the decision model based on the generated sentiment representation and the generated feature representation associated with each of the one or more digital posts; and
  generating a relevance representation associated with each of the one or more digital posts based on the at least one content feature associated with each of the one or more digital posts and identifying the stage of the decision model based on the generated relevance representation and the generated feature representation associated with each of the one or more digital posts.

13. The non-transitory computer readable medium of claim 9, wherein the neural network is a unidirectional gated recurrent neural network;
  wherein the one or more digital posts comprises a chronological sequence of digital posts comprising:
    a first post associated with a first posting time; and
    a second post associated with a second posting time after the first posting time; and
  wherein, the identifying the stage of the decision model comprises:
    identifying the stage of the decision model stage associated with the second post based on the feature representation associated with the first post and the feature representation associated with the second post.

14. The non-transitory computer readable medium of claim 9, wherein the neural network is a bidirectional gated recurrent neural network;
  wherein the one or more digital posts comprises a chronological sequence of digital posts comprising:
    a first post associated with a first posting time;
    a second post associated with a second posting time after the first posting time; and
    a third post associated with a third posting time after the first positing time and after the second posting time; and
  wherein, the identifying the stage of the decision model comprises:
    identifying the stage of the decision model associated with the second post based on the feature representation associated with the first post, the feature representation associated with the second post, and the feature representation associated with the third post.

15. A server apparatus configured to target information, the server apparatus comprising:
  a memory storing one or more digital posts that identify a product and are associated with a digital account;
  a processor executing a process comprising:
    identifying, by a neural network, a stage of a decision model associated with each of the one or more digital posts based on a feature representation generated for each digital post; and
    transmitting product-related information to the digital account, wherein the transmitting is based on the stage of the decision model identified for each of the one or more digital post,
    wherein the identifying the stage of the decision model comprises:
      generating, by another neural network, a feature representation associated with each of the one or more digital posts based on at least one content feature associated with each of the one or more digital posts, the other neural network being different from the neural network; and
      identifying the stage of the decision model based on the generated feature representation associated with each of the one or more digital post.

16. The server apparatus of claim 15, wherein the process further comprises pre-processing the one or more digital posts prior to identifying the stage of the decision model associated with the one or more digital posts, wherein the pre-processing comprises at least one of:
  filtering the one or more digital posts to remove at least one digital post indicative of spam; and
  cleaning at least one digital posts to remove inconsistent tokenization and irregular elongation of media content.

17. The server apparatus of claim 15, wherein the identifying the stage of the decision model comprises:
  extracting the at least one content feature associated with each of the one or more digital posts.

18. The server apparatus of claim 16, wherein the identifying the stage of the decision model further comprises at least one of:
  generating a sentiment representation associated with each of the one or more digital posts based on the at least one content feature associated with each of the one or more digital posts and identifying the stage of the decision model based on the generated sentiment representation and the generated feature representation associated with each of the one or more digital posts; and
  generating a relevance representation associated with each of the one or more digital posts based on the at least one content feature associated with each of the one or more digital posts and identifying the stage of the decision model based on the generated relevance representation and the generated feature representation associated with each of the one or more digital posts.

19. The server apparatus of claim 16, wherein the neural network is a unidirectional gated recurrent neural network;
  wherein the one or more digital posts comprises a chronological sequence of digital posts comprising:
    a first post associated with a first posting time; and
    a second post associated with a second posting time after the first posting time; and
  wherein, the identifying the stage of the decision model comprises:
    identifying the stage of the decision model stage associated with the second post based on the feature representation associated with the first post and the feature representation associated with the second post.

20. The server apparatus of claim 16, wherein the neural network is a bidirectional gated recurrent neural network;
  wherein the one or more digital posts comprises a chronological sequence of digital posts comprising:
    a first post associated with a first posting time;
    a second post associated with a second posting time after the first posting time; and a third post associated with a third posting time after the first positing time and after the second posting time; and wherein, the identifying the stage of the decision model comprises:

identifying the stage of the decision model associated with the second post based on the feature representation associated with the first post, the feature representation associated with the second post, and the feature representation associated with the third post.

* * * * *